United States Patent [19]

Tregilgas

[11] Patent Number: 5,552,924
[45] Date of Patent: Sep. 3, 1996

[54] MICROMECHANICAL DEVICE HAVING AN IMPROVED BEAM

[75] Inventor: John H. Tregilgas, Richardson, Tex.

[73] Assignee: Texas Instruments Incorporated, Dallas, Tex.

[21] Appl. No.: 339,363

[22] Filed: Nov. 14, 1994

[51] Int. Cl.⁶ .................................................. G02B 26/08
[52] U.S. Cl. .......................... 359/224; 359/223; 359/318
[58] Field of Search ..................................... 359/196, 198, 359/212, 214, 221, 223, 224, 234, 290, 291, 298, 318; 257/414, 415

[56] References Cited

U.S. PATENT DOCUMENTS

| | | | |
|---|---|---|---|
| 4,728,185 | 3/1988 | Thomas | 353/122 |
| 5,041,851 | 8/1991 | Nelson | 347/134 |
| 5,061,049 | 10/1991 | Hornbeck | 359/224 |
| 5,079,544 | 1/1992 | DeMond et al. | 345/84 |
| 5,096,279 | 3/1992 | Hornbeck et al. | 359/230 |
| 5,101,236 | 3/1992 | Nelson et al. | 355/229 |

*Primary Examiner*—Paul M. Dzierzynski
*Assistant Examiner*—Darren E. Schuberg

*Attorney, Agent, or Firm*—Robert C. Klinger; James C. Kesterson; Richard L. Donaldson

[57] ABSTRACT

An electrically addressable, integrated, monolithic, micromirror device (10) is formed by the utilization of sputtering techniques, including various metal and oxide layers, photoresists, liquid and plasma etching, plasma stripping and related techniques and materials. The device (10) includes a selectively electrostatically deflectable mass or mirror (12) of supported by one or more beams (18) formed by sputtering and selective etching. The beams (18) are improved by being constituted of an electrically conductive, intermetallic aluminum compound, or a mixture of two or more such compounds. The materials constituting the improved beams (18) have relatively high melting points, exhibit fewer primary slip systems than FCC crystalline structures, are etchable by the same or similar etchants and procedures used to etch aluminum and aluminum alloy, and are stronger and experience less relaxation than aluminum or aluminum alloys. Accordingly, the improved beams (18) exhibit increased strength, and decreased relaxation without requiring significant or radical deviations from the typical processing steps employed to produce the otherwise unaltered device.

31 Claims, 3 Drawing Sheets

MICROMECHANICAL DEVICE HAVING AN IMPROVED BEAM

FIELD OF THE INVENTION

The present invention relates to a micromechanical device having an improved beam, and, more particularly, to a micromirror device having an improved beam or hinge-like member. The present invention specifically relates to an electrically addressable, integrated, monolithic, micromirror device, the electrical and mechanical elements of which may be formed by the utilization of sputtering techniques, various metal and oxide layers, photoresists, liquid and plasma etching, plasma stripping and related techniques and materials, a selectively electrostatically deflectable mirror of which device is supported by one or more improved hinge-like cantilever and/or torsion beams formed by sputtering and selective etching, which beams exhibit increased strength, and decreased relaxation without requiting significant deviations from the typical processing steps employed to produce the otherwise unaltered device.

BACKGROUND OF THE INVENTION

Various types of micromechanical devices are known. Such devices include micromechanical spatial light modulators ("SLMs") having pixels formed of electrically addressable, deflectable mirrors or reflectors. SLMs are transducers capable of modulating incident light in correspondence to an electrical and/or optical input. SLMs are capable of modulating the incident light in phase, intensity, polarization, and/or direction.

The present invention relates to SLMs of the foregoing type which are called digital micromirror devices or deformable mirror devices ("DMDs"). SLM DMDs of the type involved herein may be used in a variety of devices, such as printers, imaging systems, xerographic reproduction systems and digitized video systems. See commonly assigned U.S. Pat. Nos. 5,041,851, 4,728,185, 5,101,236 and 5,079,544.

Commonly assigned U.S. Pat. Nos. 5,061,049 and 5,096,279 (hereinafter "'049" and "'279") disclose the structure of, and methods of producing, preferred micromechanical devices, specifically DMD SLMs. In general, micromechanical devices typically include a deflectable or movable mass supported by a deformable beam. According to '049, a DMD SLM may include an array or matrix of relative thick, generally planar, metal mirrors or reflectors, constituting the "mass." Each mirror comprises a layer of aluminum or an aluminum alloy, such as Al (98.5–98.8%):Si(1%):Ti(0.2–0.5%) which is formed by sputtering and selective etching.

The mirrors reside on a relatively thin layer similarly constituted and also formed by sputtering and selective etching. Each mirror is supported by one or more beams. The beams comprise portions of the relative thin layer which extend beyond the boundary of each mirror and are, in turn, ultimately supported by one or more spacers or posts which may be constituted of a photoresist or a metal. The spacers or posts define or are separated by wells beneath the mirrors and into and out of which the mirrors may move when they are selectively deflected. The spacers or posts and the wells are, in turn, formed by selective deposition and removal or patterning of metal, insulative and photoresist laminae.

An undetected DMD mirror may occupy a normal position which may be "horizontal," that is, above its well and generally parallel to a substrate on and in which the DMD is formed. Each normally positioned mirror reflects light incident thereon to a first destination. The mirror is selectively deflectable out of its normal position by the selective application thereto of a predetermined electrostatic attractive or repulsive force. A deflected mirror may be "non-horizontal" or rotated out of the horizontal. Each deflected mirror modulates light incident thereon by reflecting the light to a second destination which depends on the amount of deflection and, accordingly, the presence and/or strength of the applied electrostatic force.

Movement of a mirror out of its normal position deforms its beam(s), storing potential energy therein. The stored potential energy tends to return the mirror to its normal position once the electrostatic force is removed. The beam(s) supporting a mirror may deform in a cantilever mode, in a torsional mode, or in a combination of both modes, called the flexure mode.

The selective electrostatic deflection of the mirrors of an array or matrix thereof is selectively effected by a congruent array or matrix of electrodes located on or in the substrate and on or at the bottoms of the wells. Selected electrostatic force-producing voltages are selectively applied to the electrodes by MOSFET or functionally similar elements and associated electrical components associated with the electrodes. These circuit elements and components are typically formed on and in the substrate by traditional integrated circuit manufacturing processing techniques. Specifically, the MOSFETS or other elements and their associated components, as well as the mirrors, beams, posts or spacers and electrodes are preferably integrally, monolithically formed by typical CMOS or similar techniques in and on a silicon or other substrate.

Extensive testing and analysis of the above-described type of micromechanical device has indicated that the strength of the beams is not sufficiently great to resist relaxation—a phenomenon also known as "creep" or "deformation"—thereof following sustained usage. Such relaxation of the beams results in improper operation of micromechanical DMD SLMs and other similar micromechanical devices. For example, a relaxed beam may be incapable of maintaining its mirror in, or returning its mirror to, the normal position when there is no attractive electrostatic force applied thereto. In a non-normal position, the mirror may reflect incident light to other than the first or second destinations. Thus, relaxation of a beam leads to unintended modulation of incident light. Additionally, even if relaxation does not result in a mirror not properly returning to its normal position, relaxation of the mirror's beam(s) can result in the mirror not deflecting by the appropriate amount upon the application of the predetermined voltage to the applicable electrode. Again, improper modulation of incident light results.

Beams which are stronger than those consisting of aluminum alloys and which are less subject to relaxation are known. For example, early developed SLMs related to the type described above utilized beam-like members comprised of silicon oxide. See U.S. Pat. Nos. 4,356,730, 4,229,732 and 3,886,310. It has also been generally proposed to fabricate the beam(s) of DMD mirrors from materials stronger than, and less subject to relaxation or creep than, the aluminum alloy described above. The use of such materials carries with it, however, the likelihood that the processing sequences and materials (e.g., etchants) presently used to fabricate DMDs, including their addressing circuitry and mechanical elements, would require substantial or radical modification, possibly adding to the complexity of processing resulting in a concomitant increase in the cost of producing DMDs.

Another proposal involves fabricating beams with multiple laminae of aluminum or aluminum alloy alternating with laminae of a stronger, less ductile material, such as alumina. The outer laminae are aluminum or aluminum alloy, so that the majority of the processing steps involving etching remain the same as those described above to produce the traditional DMD structure. Because the alternating laminae are produced by periodically interrupting sputter deposition of the aluminum or aluminum alloy and sputter depositing the stronger, less ductile material, the process is complicated to that extent, and production costs may be increased.

A desiderata of the present invention is the provision of micromechanical devices, such as DMD SLMs, having beams which are stronger and relaxation-resistant, the beams being fabricated without substantially or radically increasing the complexity or cost of the DMD processing sequence.

SUMMARY OF THE INVENTION

According to the present invention, there is provided an improved deformable beam for a micromechanical device. The device includes a deflectable mass supported by the beam deflection of the mass deforms the beam. In preferred embodiments, the micromechanical device is a DMD SLM, and the mass is a movable or deflectable mirror which selectively modulates incident light as the mirror deflects.

The improved beam may be characterized in one or more of the following ways:

The beam is constituted of one or more aluminum compounds which are electrically conductive The beam is constituted of an aluminum compound of the general formula $Al_xQ_y$, where Q is not oxygen, the compound having a relatively high melting point and exhibiting fewer primary slip systems than the twelve primary slip systems of FCC crystalline structures In the previous characterization, Q is gold, calcium, copper, iron, hafnium, magnesium, niobium, nickel, scandium, cobalt, tantalum, zirconium, barium, molybdenum, strontium, tungsten, ruthenium, vanadium, chromium, iridium, rhodium, lithium, antimony, titanium, cerium, gadolinium, holmium, lanthanum, lutetium, neodymium, samarium, terbium, selenium, carbon, arsenic, boron, phosphorus or nitrogen The beam is constituted of an electrically non-insulative material selected from the group consisting of an electrically conductive aluminum intermetallic compound or a mixture of two or more such aluminum compounds In the previous characterization, the material is $Al_2Au$, $Al_2Ca$, $Al_2Cu$, $Al_3Fe$, $Al_3Hf$, $Al_3Mg_2$, $Al_3Nb$, $Al_3Ni$, $Al_3Sc$, $Al_3Ta$, $Al_3Zr$, $Al_4Ba$, $Al_4Mo$, $Al_4Sr$, $Al_4W$, $Al_6Ru$, $Al_7Cr$, $Al_8V_5$, $Al_9Co_2$, $Al_9Ir_2$, $Al_9Rh_2$, AlLi, $Al_3Ti$, AlTi, AlSb, AlAs, AlP, AlN, $Al_3Ce$, $Al_3Gd$, $Al_3Ho$, $Al_3La$, $Al_3Lu$, $Al_3Nd$, $Al_3Sm$, $Al_3Tb$, $Al_2Se_3$, $Al_4C_3$, $AlB_2$, $AlTi+Al_3Ti$, and $Al_3Ti+AlN$ The beam is constituted of an electrically conductive material selected from the group consisting of intermetallic compounds which include aluminum, compound semiconductors which include aluminum, compounds which include aluminum and a rare earth, and compounds which include aluminum and a non-metal.

In all of the above characterizations, beams so constituted are stronger and experience less relaxation than prior art beams, especially those made of aluminum or aluminum alloys. Because the improved beams include aluminum, typical or expediently modified aluminum etching chemistries and procedures may be advantageously used. Further, the beams are electrically conductive, thus permitting appropriate potentials to be applied to the mirrors via the beams, as occurs in typical prior art DMDs.

BRIEF DESCRIPTION OF THE DRAWINGS

FIG. 4 contains plan views of a variety of DMD SLMs functionally similar to those shown in FIGS. 1–3, wherein

DETAILED DESCRIPTION

Figure 1:
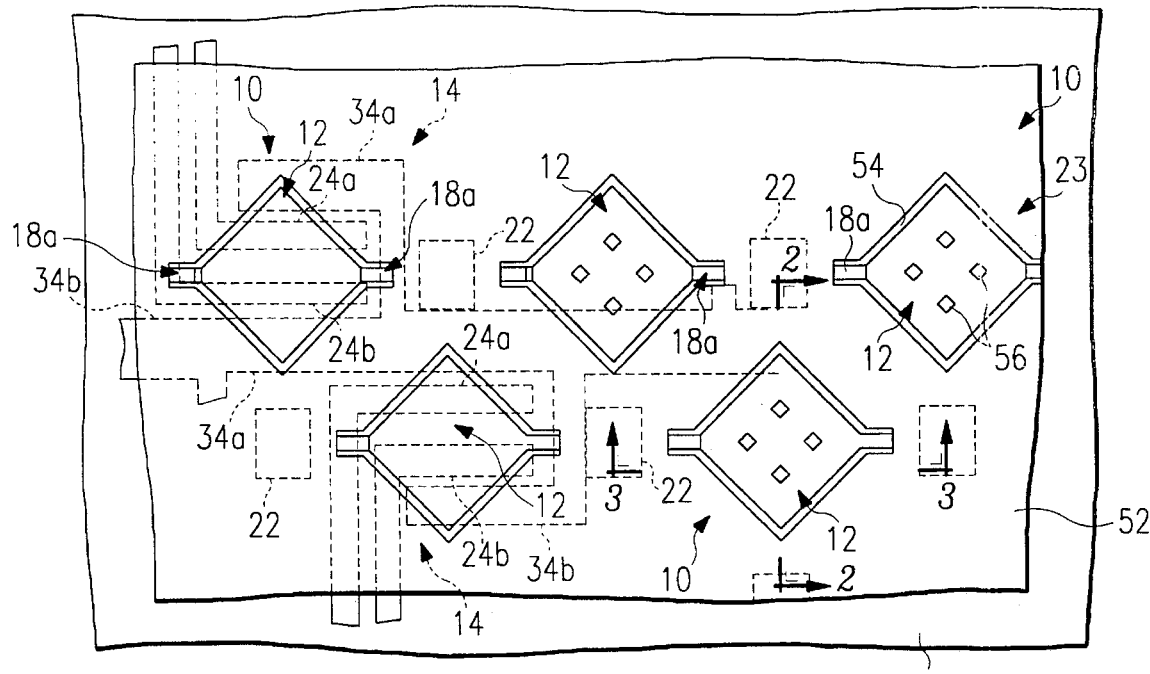
FIG. 1 is a plan view of a portion of an array of DMD SLM-type micromechanical devices illustrating the movable or deflectable masses or mirrors thereof supported by deformable torsion beams which are constituted and fabricated in accordance with the principles of the present invention.

Referring first to FIG. 1, there are shown a plurality of micromechanical devices in the form of adjacent, individual DMD's 10, which may be of the type shown in commonly assigned U.S. Pat. Nos. 5,061,049 to Hornbeck and 3,600,798 to Lee. The DMD's 10 may also be similar to those shown in U.S. Pat. Nos. 4,356,730 to Cade, 4,229,732 to Hartstein et al, 3,896,338 to Nathanson eta and 3,886,310 to Guldberg et al. The DMDs 10 may be located in an array as depicted in FIG. 1 and may be used in systems such as those shown and described in commonly assigned U.S. Pat. Nos. 5,101,236 to Nelson et al., 5,079,544 to DeMond et al, 5,041,851 to Nelson, and 4,728,185 to Thomas. In the following Description, the DMDs 10 are described as operating in a bistable or digital mode, although they may be operated in other modes, such as tristable or analog.

Figure 2:
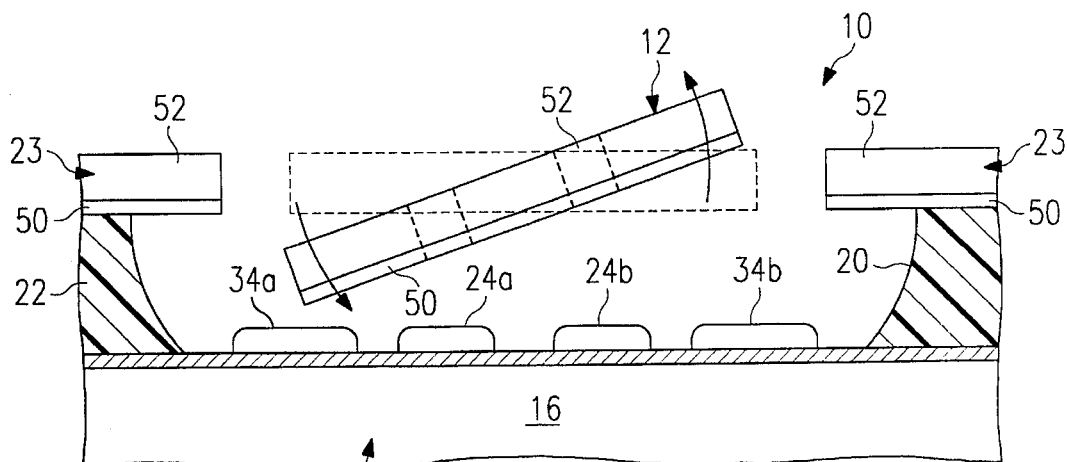
FIG. 2 is a partially sectioned side view of a single DMD taken generally along line 2—2 in FIG. 1.
Figure 3:
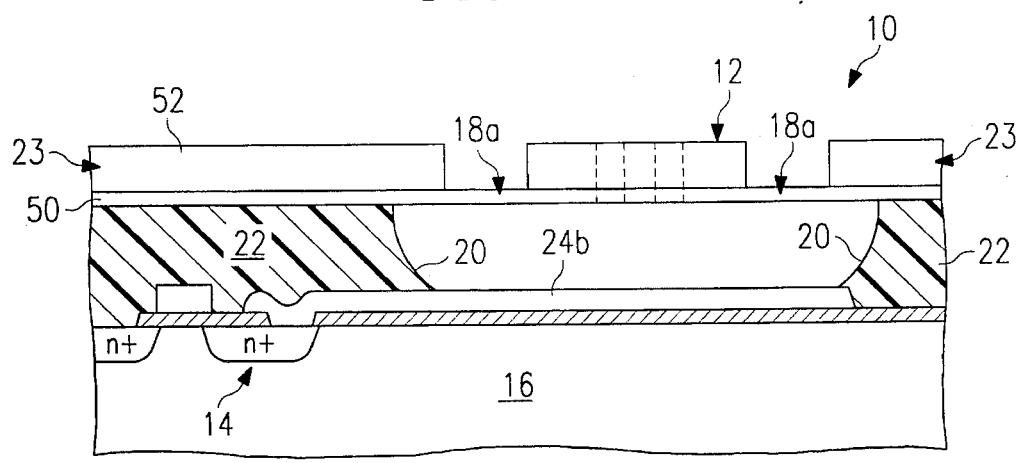
FIG. 3 is a partially sectioned side view of the DMD shown in FIG. 2 and taken generally along line 3—3 in FIG. 1.

As generally depicted in FIG. 1–3, each DMD 10 includes a selectively movable or deflectable mass, which in the case of the DMDs 10 comprises a relatively thick and massive, metal or metallic light-reflective, movable or deflectable mirror 12 and associated addressing circuits 14 (only two of which are shown) for selectively electrostatically deflecting the mirrors 12. Methods of monolithically forming an array of mirrors 12 and their addressing circuits 14 in and on common substrate 16 are set forth in the above-noted patents. Of course, micromechanical devices other than the DMDs 10 depicted and described in detail herein may advantageously utilize the principles of the present invention.

Figure 4A:
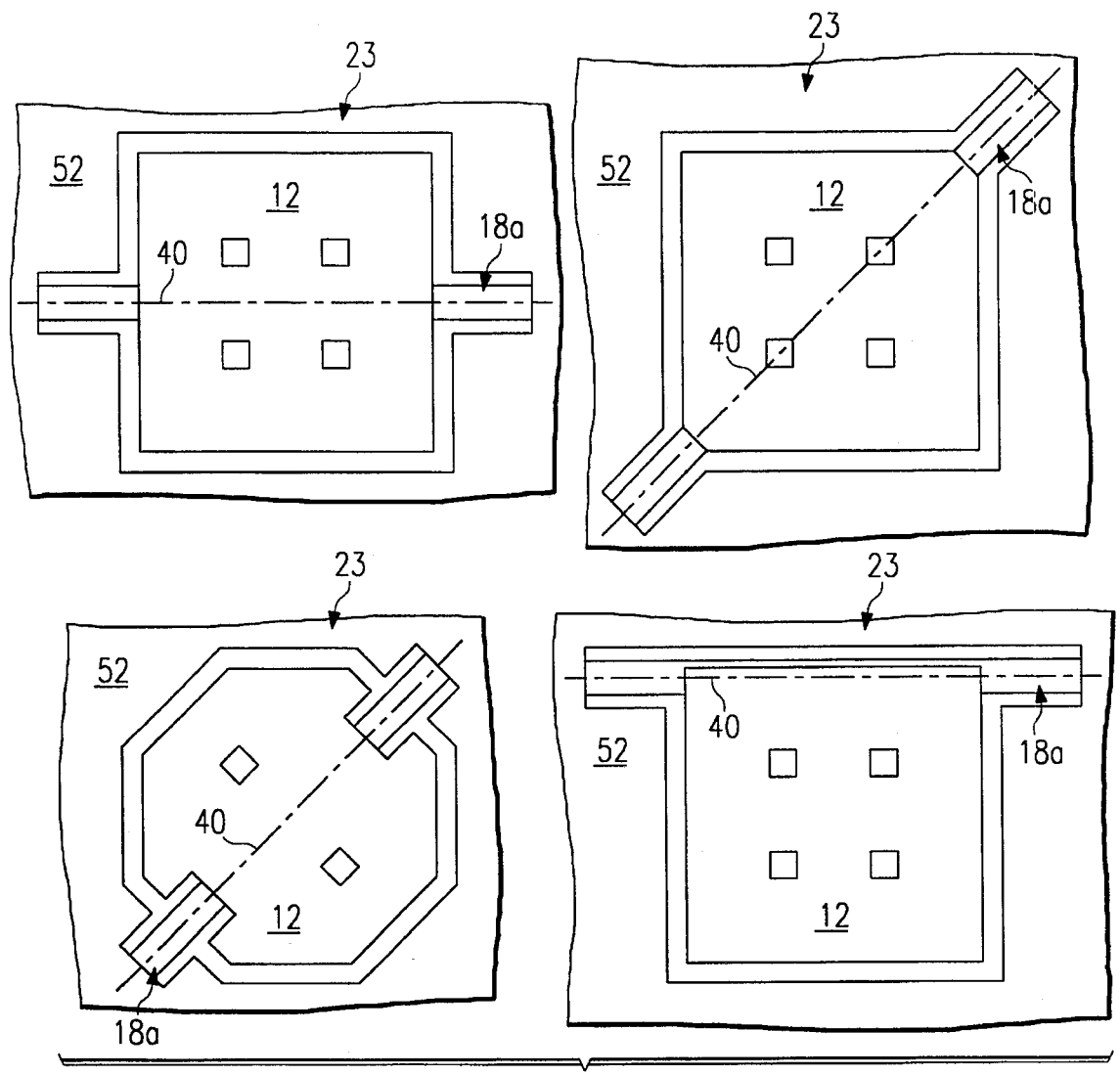
FIG. 4a depicts four types of torsion beam DMDs.
Figure 4B:
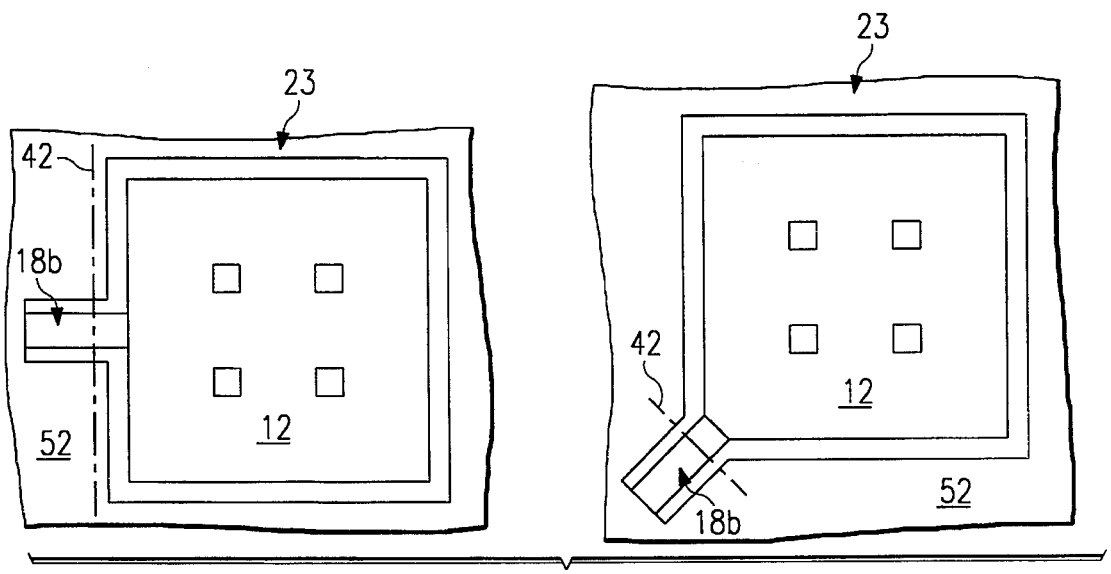
FIG. 4b depicts two types of cantilever beam DMDs.
Figure 4C:
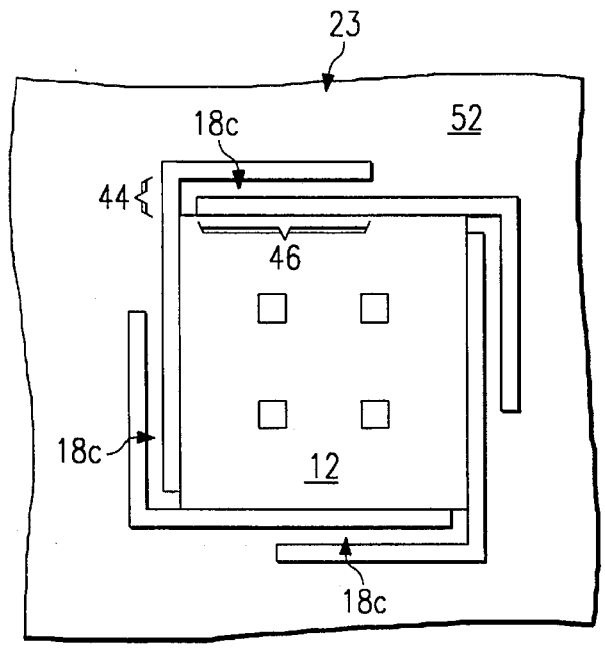
FIG. 4c depicts one type of flexure beam DMD, the beams of all of the foregoing DMDs advantageously being constituted and fabricated according to the principles of the present invention.

Typically, each mirror 12 deflects by moving or rotating on one or more relatively thin, integral supporting beams or hinges. Although FIG. 1 illustrates each mirror 12 being supported by a pair of diametrically opposed torsion beams 18*a*, the mirrors 12 may be supported by one or more cantilever beams 18*b*—two types are shown in FIG. 4*b*—or flexure beams 18*c*—one type is shown in FIG. 4*c*—as discussed earlier. FIG. 4*a* depicts four types of torsion beam-supported DMDs 10.

Undercut wells 20 (not shown in FIG. 1) are defined between columnar members 22, which may comprise residual photoresist remaining on the substrate 16 after functioning as a portion of a etching, deposition, and/or implantation mask during the formation of the DMD 10. The beams and metallic portions 23 which surround the mirrors and beams 10 and 12 and are generally coplanar with the mirrors 12 are supported by the members 22.

Each well 20 accommodates the deflection thereinto of at least a portion of its associated mirror 12 by permitting that portion to move toward the substrate 16, as shown by the directional arrows in FIG. 2, from an undeflected or normal position, shown FIG. 3. Deflection of each mirror 12 is effected by the attractive or repulsive electrostatic forces exerted thereon by electric fields which result from the application of appropriate potentials to the mirrors 12 and to associated control or addressing electrodes 24 located in the wells 20. The potentials are selectively applied to the control electrodes 24 and the mirrors 12 by the addressing circuits 14 and associated circuitry and circuit elements. Typically, the mirror 12 is at ground potential while selected voltages are applied to the control electrodes 24, thereby exerting an attractive force on the mirrors 12. Repulsive forces may be applied to the mirrors 12 by applying potentials of the same polarity to the mirrors 12 and their control electrodes 24.

When a beam 18 is undeformed, it may set the normal position of its mirror element 12, as shown in FIG. 3 and in phantom in FIG. 2. When the beam 18 is deformed, it stores therein energy which tends to return the mirror 18 to the position it occupies when the beam 18 is undeformed. Light which is incident on the device 10 when a mirror element 12 is in its normal position is reflected to a first site. When an addressing circuit 14 applies appropriate potentials, its mirror 12 is electrostatically attracted or repelled out of its normal position toward or away from the control electrode 24 and the substrate 16. The mirror element 12 accordingly moves or deflects until it engages a landing electred position.

The use of the landing electrode 34 is recommended by the aforenoted '279 patent. Specifically, the landing electrode 34 is maintained at the same potential as the mirror 12 and serves as a mechanical stop for the mirror element 12, thus setting the deflected position thereof. Further, the engagement of the landing electrode 34 and the mirror element 12 prevents the mirror element 12 from engaging the control electrode 24. Because of the potential difference between the mirror element 12 and the control electrode 24, such engagement would result in current flow through the mirror element 12. Current flow of this type is likely to weld the mirror element 12 to the control electrode 24 and/or to fuse or melt the relatively thin beam 18.

In the deflected position of the mirror element 12, the incident light is now reflected to a second site. The first site to which light is directed when a mirror 12 is undeflected may be occupied by or constitute a utilization device, such as a viewing screen or a photosensitive drum of a xerographic printing apparatus. The light directed to the second site may be absorbed or otherwise prevented from reaching the first site. The roles of the first and second sites may, of course, be reversed. In the foregoing way, incident light is modulated by the DMDs 10 so that it selectively either reaches or does not reach whichever site contains the utilization device.

In FIGS. 1–3, each mirror 12 is shown to be associated with a pair of control electrodes 24*a*,24*b* and a pair of landing electrodes 34*a*,34*b*. When the DMDs 10 are operated in a binary or bistable mode, as described above, each mirror 12 may be movable only between the normal, undeflected position represented in phantom in FIG. 2, and a counterclockwise rotated position, as shown in FIG. 2. Although not depicted in FIG. 2, counterclockwise rotation of the mirror 12 occurs until the mirror 12 engages of contacts the left-hand landing electrode 34*a*. If the mirror 12 is at the preferred ground potential, counterclockwise rotation of the mirror 12 may be effected by the application of a voltage to the left-hand control electrode 24*a* by the addressing circuitry 14. In this latter event, the right-hand control and landing electrodes 24*b* and 34*b* may be eliminated or unused.

If the mirror 12 is rotated by electrostatic repulsion, it and the right-hand control electrode 24*b* will carry same polarity potentials to achieve the counterclockwise rotation shown in FIG. 2. In this event, the left-hand control electrode 24*a* and the right-hand landing electrode 34*b* may be eliminated or unused.

The DMDs may also be operated in a binary mode in which the mirror 12 is rotatable between a normal, fully counterclockwise position and a fully clockwise position in which the mirror 12 engages the right-hand landing electrode 34*b*. When operated in this fashion, the undeformed beam 18 does not set the normal position of the mirror 12. Further, with the mirror 12 at ground potential, the mirror 12 is fully counterclockwise rotated by a potential on the control electrode 24*a*; the potential on the control electrode 24*b* has a very low magnitude or is zero. The mirror 12 is rotated fully clockwise to abut the right-hand landing electrode 34*b* by an appropriate potential on the control electrode 24*b*, with the potential on the control electrode 24*a* being zero or nearly so.

In a further binary operational permutation in which the mirror 12 is not at ground potential, voltages of different polarities and/or magnitudes may be simultaneously applied to the control electrodes 24*a*,24*b* to simultaneously attract and repel complementary portions of the mirrors 12 for selective rotation thereof. Tristable operation is achieved by rotating the mirrors 12 fully counterclockwise or fully clockwise, with the mirrors occupying a normal intermediate position set by the undeformed beam when the control electrodes 24*a*,24*b* are both deenergized. Analog operation is achieved by selected amounts of counterclockwise and/or clockwise rotation of the mirrors 12 through the application to the control electrodes 24*a*,24*b* of potentials having appropriate magnitudes. In analog operation, full rotation of the mirrors 12, characterized by engagement of the landing electrodes 34*a*,34*b*, is only one of a theoretically infinite number of rotated positions which the mirrors 12 may occupy.

FIG. 4*a* illustrates a variety of DMDs in which the mirrors 12 are supported by torsion beams 18*a*, including, at the upper right, the variety generally shown in FIGS. 1–3. As described above, mirrors 12 supported by torsion beams 18*a* are selectively rotatable on the beams 18*a* about an axis 40 which is coincident with the beams 18*a*. The axis 40 of rotation is coincident with an axis of symmetry of the mirror 12 in all but the lower right rendition, wherein the axis 40 is not so coincident. In FIG. 4b, the beams 18 are cantilever beams 18b, and the mirrors 12 are movable or deflectable about an axis 42 of rotation which is normal to the beams 18b. Though not shown in FIGS. 4a and 4b, as should be apparent, the control electrodes 24 must be asymmetrically located relative to the axes 40 and 42 of rotation.

In FIG. 4c the beams 18 are so-called flexure beams 18c which deform in both torsional and cantilever modes upon movement of the mirrors 12. Specifically, each flexure beam 18c includes a torsionally deformable element 44 and an element 46 which is deformable in a cantilever mode. Upon attraction of the mirror 12 to or repulsion of the mirror 12 from the control electrode 24 the mirror 12 moves piston-like by remaining generally parallel to the substrate 16.

Returning to FIGS. 1–3, it may be seen that each mirror 12 may include two or more layers, such as the metallic layers 50 and 52 which are shown. These layers 50,52 may be selectively deposited and patterned or etched pursuant to, and in the course of carrying out, typical procedures used to manufacture monolithic integrated circuits. In this way, the mirrors 12, beams 18 and control circuitry 14 may all be produced by a continuous series of interrelated process steps. In the past both of the layers 50,52 have comprised an alloy of Al:Ti:Si in the percent ratio of about 98.8:1:0.2, with the layer 50 being from about 500 to about 1000 Å thick and the layer 52 being from about 3,000 to about 5000 Å thick, although other thicknesses have been used. Either layer 50,52 may be another aluminum alloy or aluminum.

To fabricate DMDs, the relatively thin layer 50 is first deposited, typically be sputtering, on the free surface of a previously deposited, continuous layer of the photoresist 22. The relatively thicker layer 52 is then deposited on the free surface of the layer 50. Selective patterning of the layers 50 and 52 removes the thicker layer 52 but not the thinner layer 50 where beams 18 are to reside and removes both layers 50 and 52 where the peripheries of the mirrors 12 and the beams 18 are to reside. Between these peripheries and the surrounding regions 23 there are defined access gaps 54. Selective patterning of the layers 50,52 also produces access holes 56 through both thereof. Selective removal of the photoresist 22, as by plasma etching thereof through the access gaps and holes 54,56, produces the wells 20.

Figure 5A:
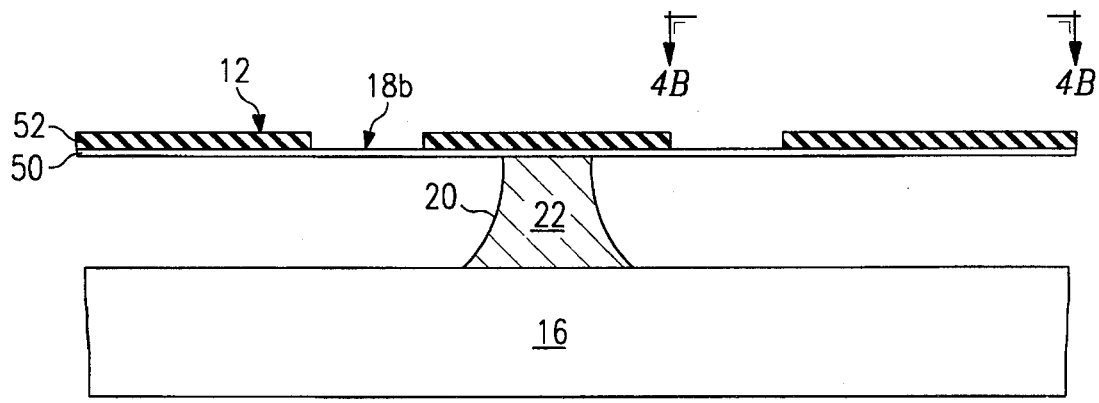
FIG. 5 contains side views of two different types of cantilever beam DMDs, FIG. 5a depicting such a DMD having a photoresist spacer supporting a cantilever beam and FIG. 5b depicting a metal post supporting a cantilever beam, all of the beams therein being conveniently constituted and fabricated pursuant to the teachings of the present invention.
Figure 5B:
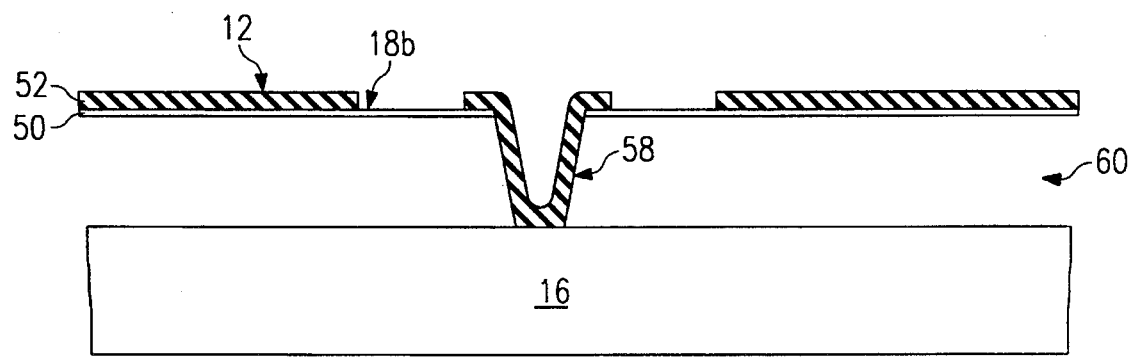

In some embodiments, it may, as noted above, be preferred for the support of the beams 18 and their mirrors 12 to be achieved by the columnar photoresist 22 which remains after formation of the wells 20. FIG. 5a illustrates this type of support in a cantilever-beam 18b DMD 10, instead of the torsion-beam 18a DMDs 10 of FIGS. 1–3. FIG. 5b illustrates a somewhat differently constructed hidden-hinge, cantilever-beam 18b DMD 10, in which support for the beam 18b and the mirror 12 is provided by a metallic post 58 which suspends the mirror 12 over an open area 60 which serves the same function as the well 20. FIGS. 35a–35e of the '049 patent illustrate a first method of manufacturing DMDs 10 of the type shown in FIGS. 1–4 and 5a hereof. In those Figures of the '049 patent, the layer 326 is a sputtered light aluminum layer which ultimately serves as a beam 18 and a sputtered light aluminum layer 328 ultimately forms the reflective mirror 12. In the same patent, FIGS. 40a–40e illustrate an alternative method for forming the DMDs 10 of the present invention in which the beams 18 are produced from a sputtered light aluminum alloy layer 180 and the mirrors 12 are produced from a sputtered light aluminum layer 190.

When a mirror 12 is in a deflected position, its beam 18 is deformed and, accordingly, stores energy therein which tends to return the mirror element 12 to the position it occupies when the beam 18 is undeformed. In theory, when the control electrode 24 is de-energized by the addressing circuit 14, the stored energy will return the mirror element 12 to this position.

DMDs 10 of the above-described types have been extensively operated and tested. Such testing indicates that DMDs 10 may experience improper operation or fail to operate due to several causes.

One cause of improper operation or failure of DMDs 10 is discussed in commonly assigned U.S. Pat. No. 5,096,279. Specifically, the mirror 12 and the landing electrode 34 which are engaged during deflection of the former may become adhered, welded or otherwise stuck together so that simple de-energization of the control electrode 24 may not result in the mirror element 12 returning to the position it occupies when the beam 18 is undeformed. Special reset signals may be applied to the control electrode 28 which overcome the sticking or adhering together of the mirror element 12 and the landing electrode 34. Other techniques for preventing the mirror elements and the landing electrodes 34 from sticking include coating these elements with appropriate substances.

Another cause of improper operation or failure of DMDs 10 relates to the fact that their beams 18 have typically comprised the layer 50 of aluminum alloy. The aluminum alloy exhibits a relatively low yield stress, and beams 18 fabricated therefrom deform over time due to creep, relaxation or deformation. These phenomena may result in catastrophic failure or breakage of a beam 18 or in a mirror 12 being positioned in other than the position dictated by the condition of its addressing circuitry 14.

The present invention replaces the layer 50 of Al:Ti:Si or other aluminum alloy with aluminum compounds which are more mechanically robust and which exhibit fewer primary slip systems than the twelve primary slip systems of the face-centered-cubic ("FCC") crystalline structure of aluminum or the previously used aluminum alloy. These aluminum compounds permit the use of the same or expediently modified deposition/etch materials and chemistries as have been used with the prior aluminum alloy. Even though some modification is necessary, unlike more robust non-aluminum materials, the modified chemistries do not require radical departure from time-tested and well understood procedures related to aluminum.

The aluminum compounds of the present invention include electrically conductive intermetallic compounds which include aluminum. Electrical conductivity is an important property for a beam 18 to possess, since DMDs of the type discussed above require the application to their mirrors 12 via their beams 18 of electrical potentials. This requirement rules out the use of certain non-electrically conducting, though robust, materials for beams 18 such as $SiO_2$. As used herein, the term "electrically conductive intermetallic compound" means (A) An electrically non-insulative compound of aluminum and another material, which other material may be (1) A metal, such as titanium, nickel, iron, niobium, tantalum, zirconium, molybdenum, tungsten, lithium, gold, calcium, copper, hafnium, magnesium, scandium, barium, strontium, ruthenium, chromium, vanadium, cobalt, iridium and rhodium, and including rare earth metals, such as cerium, gadolinium, holmium, lanthanum, lutetium, neodymium, samarium and terbium, (2) A material which may be viewed as a metal or a non-metal, such as arsenic and antimony, or (3) A non-metal, such as phosphorus, nitrogen, selenium, boron and carbon; and (B) Mixtures of compounds set forth in (A).

Compounds meeting the above definitions, that is, electrically conductive intermetallic compounds having fewer primary slip systems than FCC include (1) Compounds which comprise aluminum and another metal—$Al_2Au$, $Al_2Ca$, $Al_2Cu$, $Al_3Fe$, $Al_3Hf$, $Al_3Mg_2$, $Al_3Nb$, $Al_3Ni$, $Al_3Sc$, $Al_3Ta$, $Al_3Zr$, $Al_4Ba$, $Al_4Mo$, $Al_4Sr$, $Al_4W$, $Al_6Ru$, $Cl_7Cr$, $Al_8V_5$, $Al_9Co_2$, $Al_9Ir_2$, $Al_9Rh_2$, AlLi, $Al_3Ti$ and AlTi, (2) Compound semiconductors which include aluminum—AlSb, AlAs, AlP and AlN, (3) Compounds which include aluminum and a rare earth—$Al_3Ce$, $Al_3Gd$, $Al_3Ho$, $Al_3La$, $Al_3Lu$, $Al_3Nd$, $Al_3Sm$ and $Al_3Tb$, and (4) Compounds which include aluminum and a non-metal—$Al_2Se_3$, $Al_4C_3$ and $AlB_2$. Mixtures of the subject intermetallic compounds include $Al_3Ti$+AlN and $Al_3Ti$+AlTi.

Compounds which are preferred because of economic and functional reasons are $Al_3Fe$, $Al_3Nb$, $Al_3Ni$, $Al_3Ta$, $Al_3Zr$, $Al_4Mo$, $Al_4W$, AlAs, AlLi, AlN, AlP, AlSb, $Al_3Ti$, AlTi, $Al_3Ti$+AlTi and $Al_3Ti$+AlN.

All of the foregoing compounds may be conveniently deposited by sputtering from a compound cathode or simultaneously from multiple cathodes. Either technique may be used to control or select the ratio of the constituents of the compound. Since the foregoing compounds contain significant or high aluminum content, the same or expediently modified etching materials and etch chemistries—etchants, masks or stops—as used with previous aluminum and aluminum alloy hinges may, in general, continue to be used. For example, the appropriate conductive, ordered aluminum intermetallic compound may be sputtered to produce the layers 326 and 180 in the '049 patent, from which layers 326 and 180 the improved hinges 18 according to the present invention may be formed. No other radically significant changes to the processes described in the '049 patent are necessary to produce improved DMDs or other micromechanical devices the deformable beams of which do not experience significant relaxation or creep during many hours of use.

What is claimed is:

1. An improved deformable beam for a micromechanical device of the type which includes a deflectable mass supported by the beam, which is deformable upon deflection of the mass, wherein the improvement comprises:

the beam being constituted of one or more electrically conductive aluminum compounds exhibiting fewer primary slip systems than FCC crystalline structures.

2. An improved deformable beam for a micromechanical device of the type which includes a deflectable mass supported by the beam, which is deformable upon deflection of the mass, wherein the improvement comprises:

the beam being constituted of one or more electrically conductive, aluminum intermetallic compounds.

3. An improved beam as in claim 2, wherein:

the compounds exhibit fewer primary slip systems than FCC crystalline structures.

4. An improved beam as in claim 3, wherein:

the micromechanical device is an SLM, and the mass is a mirror.

5. An improved beam as in claim 4, wherein:

the aluminum compound has the general formula $Al_xQ_y$, where Q is not oxygen.

6. An improved beam as in claim 5, wherein:

Q is selected from the group consisting of iron, niobium, nickel, tantalum, zirconium, molybdenum, tungsten, arsenic, lithium, nitrogen, phosphorus, antimony and titanium.

7. An improved beam as in claim 6, wherein:

the beam is constituted of a mixture of the compounds.

8. An improved beam as in claim 7, wherein:

the mixture is AlTi and $Al_3Ti$.

9. An improved beam as in claim 5, wherein:

Q is selected from the group consisting of antimony, arsenic, phosphorus and nitrogen.

10. An improved beam as in claim 4, wherein:

the aluminum compound is of the general formula $Al_xQ_y$, wherein Q is selected from the group consisting of metallic elements, rare earth elements, non-metallic solid elements and non-metallic gaseous elements.

11. An improved beam as in claim 10, wherein:

Q is a metallic element selected from the group consisting of iron, niobium, nickel, tantalum, zirconium, molybdenum, tungsten, lithium and titanium.

12. An improved beam as in claim 10, wherein:

Q is a non-metallic solid element selected from the group consisting of antimony, arsenic and phosphorus, 13. An improved beam as in claim 10, wherein:

Q is nitrogen.

14. An improved beam as in claim 10, wherein:

Q is selected from the group consisting of gold, calcium, copper, iron, hafnium, magnesium, niobium, nickel, scandium, tantalum, zirconium, barium, molybdenum, samarium, tungsten, ruthenium, vanadium, columbium, iridium, rhodium, lithium, antimony, titanium, cerium, gadolinium, holmium, lanthanum, lutetium, nadolinium, samarium, terbium, selenium, carbon, arsenic, boron, phosphorus and nitrogen.

15. An improved deformable beam for a micromechanical device of the type which includes a deflectable mass supported by the beam, deflection of the mass deforming the beam, wherein the improvement comprises:

the beam being constituted of a material selected from the group consisting of intermetallic compounds which include aluminum, compound semiconductors which include aluminum, compounds which include aluminum and a rare earth, and compounds which include aluminum and a non-metal.

16. A beam as in claim 15, wherein:

the material is selected from the consisting of $Al_2Au$, $Al_2Ca$, $Al_2Cu$, $Al_3Fe$, $Al_3Hf$, $Al_3Mg_2$, $Al_3Nb$, $Al_3Ni$, $Al_3Sc$, $Al_3Ta$, $Al_3Zr$, $Al_4Ba$, $Al_4Mo$, $Al_4Sr$, $Al_4W$, $Al_6Ru$, $Al_7Cr$, $Al_8V_5$, $Al_9Co_2$, $Al_9Ir_2$, $Al_9Rh_2$, AlLi, $Al_3Ti$ and AlTi.

17. A beam as in claim 16, wherein:

the material is $Al_3Ti$.

18. A beam as in claim 16, wherein:

the material is AlTi.

19. A beam as in claim 15, wherein:

the material is a mixture of $Al_3Ti$ and AlTi.

20. A beam as in claim 15, wherein:

the material is AlN.

21. A beam as in claim 15, wherein:

the material is a mixture of AlN and $Al_3Ti$.

22. A beam as in claim 15, wherein:

the material is a compound semiconductor which includes aluminum.

23. A beam as in claim 22, wherein:

the material is AlSb, AlAs, AlP, or AlN.

24. A beam as in claim 15, wherein:
the material is a compound which includes aluminum and a rare earth.

25. A beam as in claim 24, wherein:
the material is $Al_3Ce$, $Al_3Gd$, $Al_3Ho$, $Al_3La$, $Al_3Lu$, $Al_3Nd$, $Al_3Sm$ or $Al_3Tb$.

26. A beam as in claim 15, wherein:
the material is a compound which includes aluminum and a non-metal.

27. A beam as in claim 26, wherein:
the material is $Al_2Se_3$, $Al_4C_3$ or $AlB_2$.

28. An improved beam as in claim 15, wherein:
the material is etchable by the same or similar etchants and procedures used to etch aluminum and aluminum alloy.

29. An improved beam as in claim 15, wherein:
the beam is formed by sputtering.

30. An improved beam as in claim 15, wherein:
the material is stronger and experiences less relaxation than aluminum or aluminum alloys.

31. An improved deformable beam for a micromechanical device of the type which includes a deflectable mass supported by the beam, which is deformable upon deflection of the mass, wherein the improvement comprises:
the beam being constituted of one or a mixture of two or more electrically conductive aluminum compounds which
(a) exhibit fewer primary slip systems than FCC crystalline structures,
(b) are etchable by the same or similar etchants and procedures used to etch aluminum and aluminum alloy,
(b) being depositable by sputtering, and
(c) being stronger and experiencing less relaxation than aluminum or aluminum alloys.

* * * * *